United States Patent
Albus

[11] 3,991,959
[45] Nov. 16, 1976

[54] PIPE INSTALLATION

[75] Inventor: Peter Albus, Bensberg, Germany

[73] Assignee: Interatom, Internationale Atomreaktorbau GmbH, Bensberg, Cologne, Germany

[22] Filed: Apr. 17, 1975

[21] Appl. No.: 568,861

[30] Foreign Application Priority Data
Apr. 27, 1974  Germany............................ 2420571

[52] U.S. Cl. ................................. 248/49; 188/1 B; 248/20; 248/54 CS; 248/358 R
[51] Int. Cl.² ......................................... F16F 15/28
[58] Field of Search ............. 248/18, 20, 49, 358 R, 248/54 R, 55, 54 CS; 174/42; 188/1 B; 52/167

[56] References Cited
UNITED STATES PATENTS

| | | | |
|---|---|---|---|
| 1,973,510 | 9/1934 | Schieferstein | 188/1 B X |
| 2,439,067 | 4/1948 | Wood | 248/54 CS |
| 2,676,806 | 4/1954 | Bachman | 248/358 R X |
| 2,831,048 | 4/1958 | Weaver | 174/42 |
| 3,288,419 | 11/1966 | Wallerstein | 188/1 B X |
| 3,322,379 | 5/1967 | Flannelly | 188/1 B X |
| 3,455,527 | 7/1969 | Suozzo | 248/54 R |
| 3,552,694 | 1/1971 | Flannelly | 188/1 B X |
| 3,711,624 | 1/1973 | Dulhunty | 174/42 |
| 3,848,639 | 11/1974 | Chen | 248/54 R X |

FOREIGN PATENTS OR APPLICATIONS 1,277,491   10/1961   France ........................... 248/54 CS

*Primary Examiner*—Roy D. Frazier
*Assistant Examiner*—Rodney H. Bonck
*Attorney, Agent, or Firm*—Kenyon & Kenyon Reilly Carr & Chapin

[57] ABSTRACT

A pipe installation comprises a metal pipe supported at axially interspaced positions with the pipe between these positions having an inherent resonance so that upon receiving a vibratory force, the pipe oscillates between its supported positions at a low frequency and a consequent great amplitude which excessively stresses the pipe. A balance beam has short and long arms, the short arm being connected to the pipe between its positions of support, and a mass being connected to the long arm. In this way a smaller mass can be used to detune the pipe than would be required if the mass were to be connected directly to the pipe.

4 Claims, 2 Drawing Figures

PIPE INSTALLATION

BACKGROUND OF THE INVENTION

Power plants often require a pipe installation characterized by a metal pipe and means for supporting the pipe at axially interspaced positions. When the pipe is subject to thermal expansion and contraction movements in its axial direction, it is desirable that it be supported at positions as far apart as is possible without the pipe, because of its weight and dimensions and the elasticity of metal, sagging to an impractical extent between its supported positions.

An example of such a pipe installation can be the main coolant loop of a pressurized-water reactor installation, where each leg of the loop must be formed by a pipe having one end rigidly connected to the reactor pressure vessel and the other end rigidly connected with the primary header of a steam generator, the cold leg having its usual interposed main coolant pump. The pipe carries the pressurized-water coolant and is, therefore, subject to axial movement due to the thermal changes inherently involved by the operation of the reactor. To permit this movement, it is desirable that such main coolant loop pipes be as free from supports between their ends as is consistent with their support against undue sagging due to their weight, which includes that of the water coolant they carry, and considering their relatively great length as compared to their diameter.

It follows that in many cases the pipe between its supporting positions forms a free span representing a vibratory system having an inherent resonance involving low frequencies and consequently large amplitudes. If the system is disturbed as by receiving a vibratory force, the pipe can be made to oscillate between its supported positions at a low frequency and consequently a great amplitude excessively stressing the pipe's wall which is, of course, a solid wall and not designed to be flexed to any great degree.

The results of such oscillations of large amplitude can be very serious. In the case of the reactor installation referred to, it must be designed in anticipation of the remote chance that pipes might receive the force of seismic disturbances, such as an earthquake, in which event one or more of the main coolant loop pipes might be excited to such a degree that it oscillates with such a large amplitude as to stress the pipe wall to a degree ultimately resulting in a rupture, releasing the pressurized-water coolant which might possibly be radioactive.

The prior art has proposed the attachment of a mass to such a vibratory pipe span, the mass being connected between the supported ends of the span, to detune the vibratory system involved. However, in many cases, where the pipe length is great as compared to its diameter, particularly with the pipe containing a liquid, such as water, the size of the mass required to provide an effective result, is too large to be considered as a practical solution.

SUMMARY OF THE INVENTION

With the above in mind, an object of the present invention is to provide a more practical solution.

As indicated above, one solution is to connect a mass directly to the pipe span between its supported ends. In this way the span can be detuned so it can no longer be excited by vibrations above 0.5 Hz, if the mass involved is great enough which, however, involves a large size.

According to the present invention, a mass of smaller value can be used, this being effected by using a balance beam having a fulcrum and relatively shorter and longer arms having outer end portions, means being provided for connecting the outer end portion of the shorter arm to the pipe at a location between its supported positions required for largely static reasons, and a mass being connected to the outer end portion of the beam's longer arm and balancing the beam at equilibrium. Being made of metal which is inherently elastic, the pipe necessarily is gravitationally deflected downwardly between the supported end of the span involved, so that at the location where the pipe is connected to the outer end of the shorter arm, it applies its mass to that end of the arm. The relatively small mass at the outer end of the longer arm of the balance beam, balances this weight. The result is that a mass of relatively small value end, therefore, size, counterbalancing the pipe's mass at that location, has an effective detuning effect of a much larger mass connected to the pipe at the same location. The physics involved are as follows:

A long pipeline which is clamped solidly at its ends can physically be considered, in view of its elasticity, as a spring-supported mass M. If one designates the proposed supplemental mass with $m$ and the length of the arms of the balance beam, at which these masses are suspended, with $a$ and $b$, respectively, and if one further assumes that the suspension point of the balance beam and the two firmly clamped end points of the pipeline (i.e., the counter-support of the spring on which the mass M rests) are moved in the same direction and by the same distance $f$, then the mass M is deflected by the distance $x_1$ and the mass m by the distance $x_2$, where the balance beam rotates about its suspension. The kinematic relation then holds $$x_2 = -x_1 \cdot \frac{b}{a} + \frac{a+b}{a} \cdot f$$

If one further designates with $P_a$ the force acting on the mass M via the lever $a$, with $P_b$ the corresponding force acting on the mass $m$ via the lever $b$, with $P_m$ the inertial force from M and with $P_m$ the inertial force from $m$, as well as with $P_F$ the spring force, the dynamic equilibrium conditions hold:

$$P_a + P_M + P_F = 0$$

$$P_b + P_m = 0$$

$$P_a \cdot a = P_b \cdot b$$

$$P_M + -M\ddot{x}_1$$

$$P_m = -m\ddot{x}_2$$

$$P_F = -k(x_1 - f)$$

where $k$ denotes the spring constant.

From this one obtains the absolute movement as $$-(M + (\frac{b}{a})^2 m)\ddot{x}_1 - kx_1 = -kf - \frac{a+b}{a} \cdot \frac{b}{a} \cdot m\ddot{f}$$

or the relative displacement $r_1 = x_1 - f$ as:

$$\left(M+\left(\frac{b}{a}\right)^2 m\right) \ddot{r}_1 + k r_1 = \left(\frac{b}{a} m - M\right) \ddot{f}$$

If, as assumed above, the balance beam is at equilibrium, i.e., $$bm = aM,$$

no movement of the individual parts of the system relative to each other occurs in spite of the movement $f$. It is furthermore seen that the supplemental mass $m$ enters into the equation multiplied by the square of the lever arm ratio $b/a$ and causes the desired detuning. It follows from this that, with the length ratio of the two lever arms chosen as large as possible, only a relatively small supplemental mass is required. In addition, the disturbance introduced from the outside is attenuated linearly with the lever and mass ratio.

As previously indicated, in many instances, the pipe is subject to axial movement because of thermal expansion and contraction, and to accommodate this movement, the connection between the outer end of the shorter arm of the balance beam, can be connected to the pipe in a vertically-rigid manner, but permitting the pipe to move in its axial direction relative to the end of the shorter arm. Because this changes the lever ratio between the two arms of the balance beam, the mass can be made movable on the longer arm of the balance beam, to permit maintenance of the balancing and keep the beam at equilibrium. To avoid the need for manual adjustment of the position of the mass on the beam's longer arm, the invention provides means for transmitting the axial movement of the pipe reversely to the mass to maintain the balance.

BRIEF DESCRIPTION OF THE DRAWINGS

The accompanying drawings schematically illustrate the invention, the various figures being as follows.

DETAILED DESCRIPTION OF THE INVENTION

Figure 1:
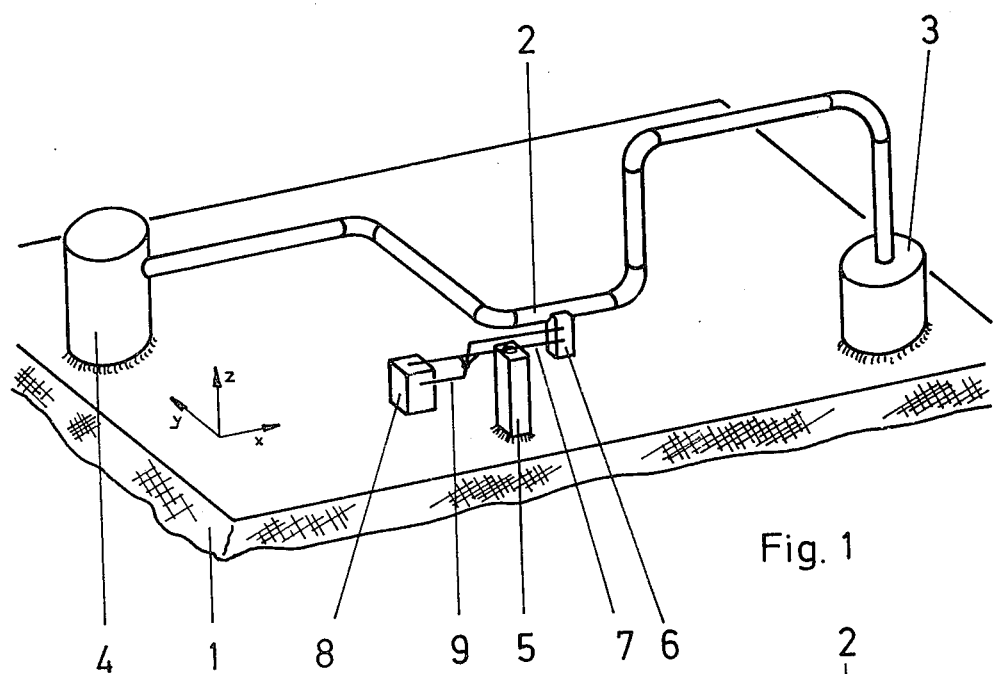
FIG. 1 shows a pipe installation with one embodiment of the invention in use, this view being a simulated perspective view.

Referring to the above drawings, FIG. 1 shows a foundation slab, which could be the concrete construction of a pressurized-water reactor building, a pipe span 2 of long length relative to the pipe diameter, and two units 3 and 4 to which the ends of the pipe are rigidly connected, one of these units conceivably being a pressurized-water reactor pressure vessel, and the other being the reactor steam generator, with the understanding that in such a case the pipe 2 would represent only one leg of the reactor main coolant loop. The pipe 2 is to be understood as being solid walled and made of metal with its inherent elasticity. The pipe 2 is shown as being unsupported between its ends by rigid supports intended to support the pipe against sagging due to its weight and elasticity and its relatively long span length. It can be assumed that the pipe 2 contains liquid, such as pressurized-water coolant being circulated between the two units 3 and 4. Furthermore, the concrete slab 1 on which the units 3 and 4 are mounted, integrate these units so that if the slab 1 receives vibrations, it is imparted to both units and, therefore, to the span of pipe 2.

If the slab 1 starts to vibrate, as it might do because of receiving seismic vibrations, such as might result from an earthquake, these vibrations are imparted to the the pipe 2. It is to be assumed that the pipe 2 forms a vibratory system as previously described and it has an inherent or natural resonance having a frequency roughly coinciding with the frequency of the vibrations imparted to the pipe 2. Because of the length of the pipe span involved, it is to be further assumed that at resonance the pipe 2 will vibrate with an amplitude excessively stressing the pipe and possibly resulting in its rupture, such a rupture being particularly serious if the pipe is carrying possibly radioactive pressurized-water coolant. If to prevent this danger the pipe 2 is clamped between its rigid connections with the units 3 and 4, the pipe will be excessively stressed because its length then would not accommodate axial movements induced by thermal expansion and contraction. If it were not for this, the pipe could be broken down into shorter span lengths forming a number of vibratory systems having a resonance frequency substantially higher than would be expected to result from the seismic disturbances. Incidentally, comparable pipe spans are also involved in the case of marine installations, but here the pipe could be caused to resonate because of the wave motion imparted to it through the structure of the ship involving the installation.

According to the present invention, a column 5 is rigidly fixed to the slab or foundation 1 and on which a balance beam 7 is connected at the beam's fulcrum point by means of a universal joint 10 as represented by a ball and socket joint. Therefore, the beam 7 can rotate and swing in all directions. The balance beam 7 should be designed with sufficient stiffness so that it is inherently free from any appreciable resonance at the frequencies of the vibrations which the slab 1 could reasonably be expected to receive.

The balance beam 7 has a short arm A7 to the outer end of which a mounting 6 is connected. The balance beam has a long arm B7 to the outer end of which the mass 8 is connected. The mounting 6 connects with the outer end of the short arm A by way of a slidable joint 6a which permits movement of the mounting 6 in the axial direction of the pipe 2 but which is rigid to movement in other directions and the mounting 6 connects with the pipe 2 between the ends of the pipe connected to the units 3 and 4, by way of a pivot pin 11. The joint 6a also permits rocking motion of the balance beam 7, the pivot pin 11 permitting horizontal swinging of the balance beam 7. The mass 8 is provided with rollers 12 engaging the outer end of the long arm B in a manner rigid to all directions excepting movement of the mass 8 longitudinally with respect to the arm B.

As shown by FIG. 1, although the pipe 2 is formed with a right angular bend in the horizontal plane, the pipe can move in the directions indicated by X and Y arrows, in fact all of the directions indicated by the arrows X, Y and Z, with the mounting 6 following these motions while through the balance beam 7 the pipe 2 is influenced by the mass 8 when this mass is adjusted to counterbalance the mass of the pipe 2 at its location where it is engaged by the mounting 6 through the joint 11. In addition to the right angular bend in the horizontal plane, the pipe 2 has bends in the vertical plane, but regardless of the direction in which the pipe axially moves due to thermal expansion and contraction, the movement is accommodated as described during the support it receives from the mass 8 via the balance beam 7.

Figure 2:
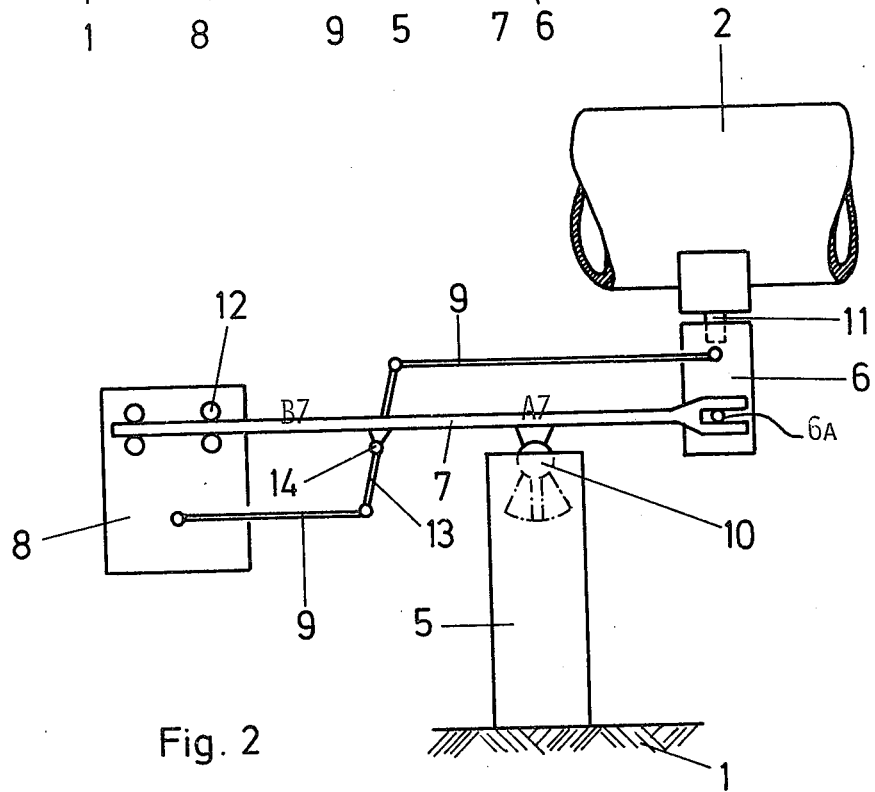
FIG. 2 in elevation and on an enlarged scale shows details of the invention.

However, when the pipe 2 moves in the direction X at the location where it is supported by the mass 8 through the balance beam, the equilibrium of the balance beam can be maintained only by adjustment of the mass 8 longitudinally along the arm B of the balance beam. Although this could be done manually, automatic balancing is desirable. Therefore, according to the invention, the balance beam and its parts are provided with interconnecting means for transmitting any axial movement of the pipe reversely to the mass 8 to maintain the balancing or equilibrium condition. As illustrated, this comprises a two-arm lever 13 pivoted to the balance beam 7 at 14 with the outer ends of its two lever arms having links 9 connecting the lever ends respectively with the pipe 2, via the parts 6 and 11, and with the mass 8. The ratio between the lengths of the oppositely extending lever arms of the two-arm lever 13 are proportioned relative to the mass and the mass of the pipe 2, where carried by the mounting 6, and the lengths of the arms A and B, to maintain the balancing with the arms 7 in a condition of equilibrium. If the pipe 2 moves the mounting 6 to the left, as viewed in FIG. 2, the mass 8 is moved to the right on the balance beam arm B, and vice versa. Once the present invention is understood, the proportioning of the various parts can be effected by normal engineering calculations.

It can be seen that with this invention the mass 8 can be made relatively very small as compared to the size of the mass that would be required if connected directly to the pipe 2. Thermal expansion and contraction of the pipe 2 in all of the directions X, Y and Z indicated in FIG. 1, is freely possible, so the pipe cannot be stressed by thermal effects to a degree other than is inherently involved by an unsupported pipe span. Any motion of the pipe 2 changing the length of the balance beam's arm A relative to the universally joined fulcrum 10, is automatically transmitted reversely to the mass 8 so that the beam 7 is always automatically balanced in a condition of equilibrium. Keeping all of this in mind, the fact remains that the pipe 2 is, in effect, rigidly supported by the mounting 6 so that the originally long span of pipe between the units 3 and 4, is now guided into two shorter spans inherently having resonance frequencies higher than could be expected from seismic disturbances, while the span length as a whole, from the unit 3 to the unit 4, acquires a lower resonancy of frequency than would normally be involved by seismic disturbances. The detuning of the span length of the pipe, of course, depends on the frequencies of the vibrations which the pipe is expected to receive under service operating conditions.

What is claimed is:

1. A pipe installation comprising a metal pipe and means for supporting the pipe at axially interspaced positions with the pipe between said positions having an inherent resonance causing the pipe, upon receiving a vibratory force, to oscillate at a low frequency and a consequent great amplitude which excessively stresses the pipe, a balance beam having a fulcrum and relatively shorter and longer arms having outer end portions, means for connecting the outer end portion of the shorter arm to said pipe at a location between said positions, and a mass connected to the outer end portion of the beam's longer arm and balancing the beam at equilibrium, said pipe being subject to thermally induced axial movement at said location, the second-named means permitting said axial movement relative to the outer end portion of the beam's shorter arm, and said mass being movable to permit maintenance of said balancing regardless of said axial movement.

2. The installation of claim 1 having interconnecting means for transmitting said axial movement reversely to said mass to maintain said balancing.

3. The installation of claim 2 in which said interconnecting means comprises a two-arm lever pivoted on said beam and having levers with lever ends with links connecting these lever ends respectively with said pipe at said location and with said mass.

4. The installation of claim 3 in which the ratio between the lengths of said levers is proportioned relative to said mass and the mass of said pipe at said location and the lengths of said arms, to maintain said balancing.

* * * * *